United States Patent
Welch et al.

(10) Patent No.: US 7,408,841 B1
(45) Date of Patent: Aug. 5, 2008

(54) SYSTEM AND METHOD FOR CALCULATING THE DIRECTIVITY INDEX OF A PASSIVE ACOUSTIC ARRAY

(75) Inventors: John R Welch, Westport, MA (US); Andrew J Hull, Portsmouth, RI (US); Shawn M Amorino, Waldorf, MD (US)

(73) Assignee: The United States of America as represented by the Secretary of the Navy, Washington, DC (US)

(*) Notice: Subject to any disclaimer, the term of this patent is extended or adjusted under 35 U.S.C. 154(b) by 0 days.

(21) Appl. No.: 11/829,566

(22) Filed: Jul. 27, 2007

(51) Int. Cl.
*H04B 11/00* (2006.01)
*G01S 3/80* (2006.01)
(52) U.S. Cl. .................... 367/131; 367/119; 381/92
(58) Field of Classification Search ............ 367/129, 367/131, 119; 381/92
See application file for complete search history.

(56) References Cited

U.S. PATENT DOCUMENTS 6,192,134 B1 * 2/2001 White et al. ............. 367/129
6,826,284 B1 * 11/2004 Benesty et al. ............ 381/92
7,218,741 B2 * 5/2007 Balan et al. ............... 381/92

* cited by examiner

*Primary Examiner*—Ian J Lobo
(74) *Attorney, Agent, or Firm*—James M. Kasischke; Jean-Paul A. Nasser; Michael P. Stanley

(57) ABSTRACT

A software system and method is presented that calculates the sensor directivity at all spatial angles, and stores these values in a two dimensional matrix. These values are then used as additional "weighting" coefficients in the equation for the pressure detected by an array of directive sensors. The azimuthal and polar angles of a particular sensor normal vector are used to "rotate" the sensor directivity matrix to account for the angular orientation of each sensor within the array. The software system receives as input sensor and array geometry, shading functions, sensor shape, array structure baffling, steering, and shading. A sensor can have the shape of a point, line, plane, volume, baffled ring, or circular plane piston. The sensors within the array can either be baffled by the array structure or retain their free field directivity response, and array as a whole can have steering or no steering.

17 Claims, 9 Drawing Sheets

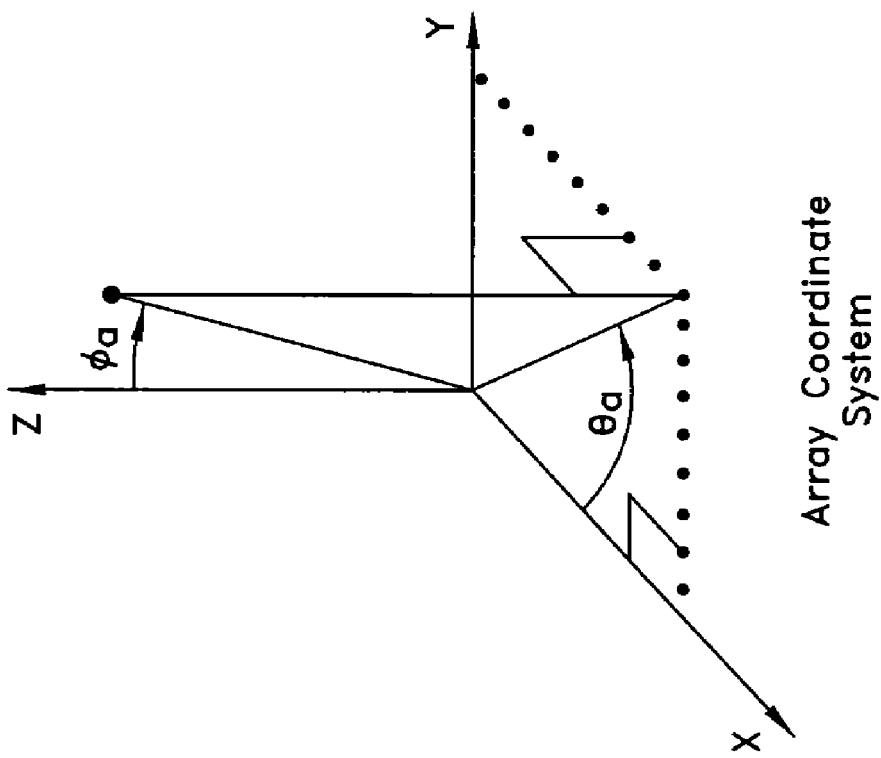
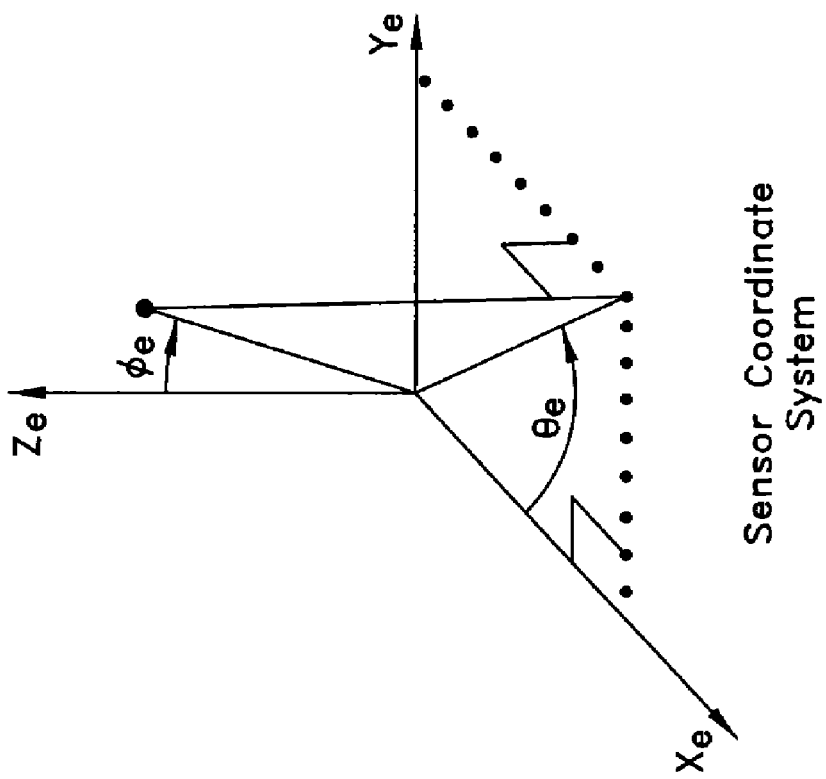
FIG. 2

Orientation of the Array Axis, Collinear with the Z-Axis
(The $X_e$-$Z_e$ plane of the sensor is parallel to the axis of the array.)

Orientation of the Array Axis, Collinear with the X-Axis
(The $X_e$-$Y_e$ plane of the sensor is parallel to the axis of the array.)

— Normal vector position in sensor coordinate system
— Normal vector position in array coordinate system

SENSOR DATA

Baffling
⦿ Baffled by array
○

Directivity
⦿ Sensor w/Omni-Directional Point Receivers
○ Sensor w/Cosine Function Directivity ☐

○ Baffled Ring
   Ring Diameter ☐
   Ring Height ☐
   Length of Baffle ☐
   Mode Vibration ☐

○ Cicular Plane Piston
   Piston Diameter ☐

FILE NAME CONTAINING ARRAY DATA ☐

OPERATIONAL DATA

Sound Speed (m/s) ☐
Angular Integration Increment Deg ☐

Steering
⦿ Array Steering
   Azimuthal (theta) Steer Angle (0–180 deg) ☐
   Polar (Phi) Steer Angle (0–180 deg) ☐
○ No Array Steering

FREQUENCY DATA

⦿ List of Frequencies ☐
○ Single Frequency Beam Pattern
   Signal Frequency (Hz) ☐
   Beam Pattern Plane ☐
   Beam Pattern Angle (0–180 deg) ☐

REPLOT

CALCULATE DI (dB)   EXIT

FIG. 5

| | A | B | C | D | E | F | G | H |
|---|---|---|---|---|---|---|---|---|
| 1 | 0 | 0 | 2.4 | 90 | 0 | 1 | | |
| 2 | 0 | 0 | 2.1 | 90 | 0 | 1 | | |
| 3 | 0 | 0 | 1.8 | 90 | 0 | 1 | | |
| 4 | 0 | 0 | 1.5 | 90 | 0 | 1 | | |
| 5 | 0 | 0 | 1.2 | 90 | 0 | 1 | | |
| 6 | 0 | 0 | 0.9 | 90 | 0 | 1 | | |
| 7 | 0 | 0 | 0.6 | 90 | 0 | 1 | | |
| 8 | 0 | 0 | 0.3 | 90 | 0 | 1 | | |
| 9 | 0 | 0 | 0 | 90 | 0 | 1 | | |
| 10 | 0 | 0 | −0.3 | 90 | 0 | 1 | | |
| 11 | 0 | 0 | −0.6 | 90 | 0 | 1 | | |
| 12 | 0 | 0 | −0.9 | 90 | 0 | 1 | | |
| 13 | 0 | 0 | −1.2 | 90 | 0 | 1 | | |
| 14 | 0 | 0 | −1.5 | 90 | 0 | 1 | | |
| 15 | 0 | 0 | −1.8 | 90 | 0 | 1 | | |
| 16 | 0 | 0 | −2.1 | 90 | 0 | 1 | | |
| 17 | 0 | 0 | −2.4 | 90 | 0 | 1 | | |
| 18 | | | | | | | | |

FIG. 7

|    | A    | B | C | D |
|----|------|---|---|---|
| 1  | 500  |   |   |   |
| 2  | 630  |   |   |   |
| 3  | 800  |   |   |   |
| 4  | 1000 |   |   |   |
| 5  | 1250 |   |   |   |
| 6  | 1600 |   |   |   |
| 7  | 2000 |   |   |   |
| 8  | 2500 |   |   |   |
| 9  | 3150 |   |   |   |
| 10 | 4000 |   |   |   |
| 11 |      |   |   |   |

FIG. 8

SYSTEM AND METHOD FOR CALCULATING THE DIRECTIVITY INDEX OF A PASSIVE ACOUSTIC ARRAY

STATEMENT OF GOVERNMENT INTEREST

The invention described herein may be manufactured and used by or for the Government of the United States of America for governmental purposes without the payment of any royalties thereon or therefore.

BACKGROUND OF THE INVENTION (1) Field of the Invention

The present invention is directed to passive acoustic arrays. In particular, the present invention is directed to a system and method for calculating the directivity index of a passive acoustic array with directional sensors in an isotropic noise field, and to provide an efficient way to create, modify, and model any array geometry for the purposes of determining the directivity index of the array as a function of array geometry, sensor geometry, sensor to sensor spacing, and number of sensors.

(2) Description of the Prior Art

Passive acoustic arrays are a necessary component of an underwater vehicle's sonar system. In order to better develop the technology of passive acoustic arrays, it is necessary to develop a system and method for calculating the directivity index of an acoustic array. There are several prior art methods that calculate the directivity index of an array of sensors. The inputs to these prior art methods include the geometry of the array, the number of sensors, shading coefficients for each sensor, sound speed of the operating medium, and the array steering. The prior art methods are limited to array geometries with simple shapes such as a line, plane, cylinder, or sphere, and capable of addressing arrays with point receiver sensors only. In addition, prior art methods calculate the directivity of each sensor within the array as frequency independent and limited to either an omni-directional or cosine function dipole response. What is needed is a system and method for calculating the directivity index of a passive acoustic array that can factor in complex sensor and array geometries and can provide a directivity index that is also frequency dependant and not limited to either an omni-directional or cosine function dipole response.

SUMMARY OF THE INVENTION

It is a general purpose and object of the present invention to disclose a system and method for calculating the directivity index of a passive acoustic array that can factor in complex sensor and array geometries.

It is a further object of the present invention to disclose a system and method for calculating the directivity index of a passive acoustic array that is also frequency dependant.

It is a further object of the present invention to disclose a system and method for calculating the directivity index of a passive acoustic array that is not limited to either an omni-directional or cosine function dipole response.

The above objects are accomplished with the present invention by a software system and method that calculates the sensor directivity at all spatial angles, and stores these values in a two dimensional matrix. These values are then used as additional "weighting" coefficients in the equation for the pressure detected by an array of directive sensors. The azimuthal and polar angles of a particular sensor normal vector are used to "rotate" the sensor directivity matrix to account for the angular orientation of each sensor within the array. The software system receives as input sensor and array geometry, shading functions, sensor shape, array structure baffling, steering, and shading. A sensor can have the shape of a point, line, plane, volume, baffled ring, or circular plane piston.

The sensors within the array can either be baffled by the array structure or retain their free field directivity response, and array as a whole can have steering or no steering.

BRIEF DESCRIPTION OF THE DRAWINGS

A more complete understanding of the invention and many of the attendant advantages thereto will be more readily appreciated by referring to the following detailed description when considered in conjunction with the accompanying drawings, wherein like reference numerals refer to like parts and wherein:

FIG. 2 is an illustration of the sensor and array coordinate system;

FIGS. 3a and 3b are illustrations of a properly aligned array axis for two possible orthogonal orientations of a baffled ring within an array of;

FIG. 5 is an illustration of the preferred embodiment of the graphical user interface.;

FIG. 7 illustrates the sensor array data in matrix or spreadsheet format;

FIG. 8 illustrates the frequency data in matrix or spreadsheet format;

DETAILED DESCRIPTION

Figure 1:
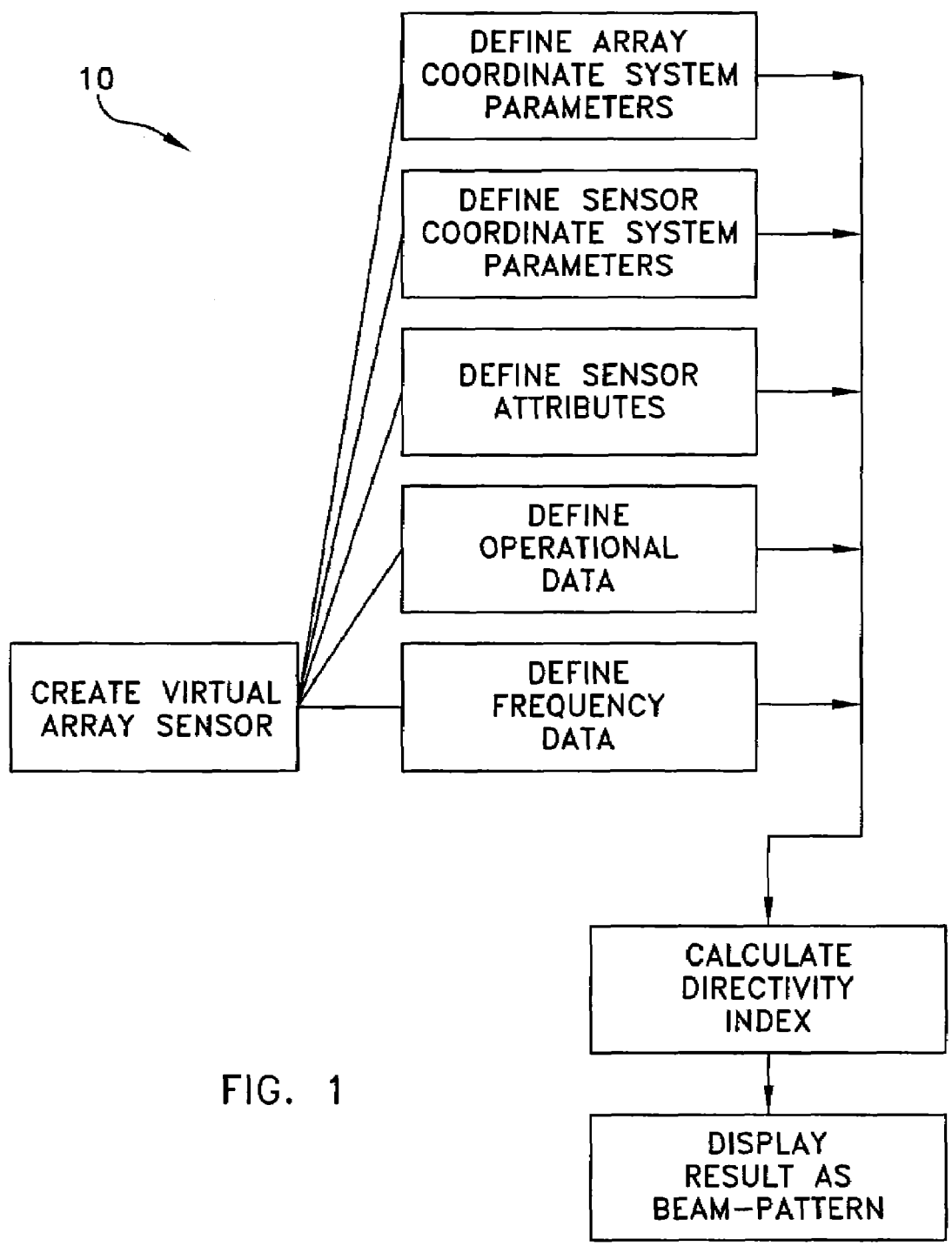
FIG. 1 is flow chart which represents the necessary steps of the method to calculate the directivity index of an array of sensors.

Referring initially to FIG. 1, there is shown a flow chart 10 which represents the steps of the software method to calculate the directivity index of an array of acoustic sensors. It is assumed that the array is operating in an ideal isotropic noise field with a perfectly correlated signal relative to an omni-directional receiver. The first step is to create a virtual model of the sensor array. In a preferred embodiment, the virtual model of the sensor array is generated by a computer program using the following equation for the pressure detected by an array of directive sensors $A_a$:

$$A_a(\theta_a - \theta_s, \phi_a - \phi_s) = \sum_{m=1}^{M} H_e(\theta_{em}, \phi_{em}) w_m e^{i[X_m(k_x - k_{xs}) + Y_m(k_y - k_{ys}) + Z_m(k_s - k_{zs})]} \quad (1)$$

Equation (1) pertains to a generic array of directive sensors and is modified depending upon the type of sensor used and other relevant operating parameters. The subscript a denotes the acoustic array; $\theta_a$ and $\phi_a$ are the azimuthal and polar angles, respectively, relative to the array coordinate system as illustrated in FIG. 2; $\theta_s$ and $\phi_s$ are the steer angles in the azimuthal and polar directions, respectively; M is the total number of sensors in the array; subscript e denotes the acoustic sensor; $H_e$ is the additional weighting coefficient to account for the directivity of each sensor; $w_m$ is the shading coefficient of the $m^{th}$ sensor; and $X_m$, $Y_m$, and $Z_m$ are the coordinates of the $m^{th}$ sensor relative to the array's coordinate system.

The term $H_e$ is dependant on the azimuthal and polar angles of the $m^{th}$ sensor with respect to the array's coordinate system. These angles $\theta_{em}$ and $\phi_{em}$, are described by the following equations:

$$\theta_{em} = \tan^{-1}\left[\frac{\sin\phi_a[\sin(\theta_a - \theta_{nm})]}{\cos\phi_{nm}\sin\phi_a[\cos(\theta_{nm} - \theta_a)] - \sin\phi_{nm}\cos\phi_a}\right] \quad (2)$$

and $$\phi_{em} = \cos^{-1}[\sin\phi_{nm}\sin\phi_a[\cos(\theta_{nm}-\theta_a)] - \cos\phi_{nm}\cos\phi_a] \quad (3)$$

where $\theta_{em}$ and $\phi_{em}$ are the azimuthal and polar angles, respectively, of the normal vector for the $m^{th}$ sensor.

The azimuthal and polar angles of a sensor's normal vector have defined ranges. These are defined using both the sensor and array coordinate systems. The angular position of the sensor's normal vector within the array coordinate system is relative to its position within the sensor coordinate system. The range of the normal vector azimuthal angle within the array coordinate system is 0 to 180. The range of the normal vector polar angle within the array coordinate system is −90 to 90. The azimuthal and polar angles of the sensor's normal vector as defined in the array coordinate system are shown in FIG. 3. The wave numbers are as follows:

$$k_x = \frac{\omega}{c}\cos\theta\sin\phi, \quad (4)$$

$$k_y = \frac{\omega}{c}\sin\theta\sin\phi, \quad (5)$$

$$k_z = \frac{\omega}{c}\cos\phi, \quad (6)$$

where $\omega$ is the frequency in radians/second, and c is the speed of sound in meters/second. The subscript is dropped from the angles $\theta$ and $\phi$ because the wave numbers are the same for the sensor and the array. The steer orientation of the array of acoustic sensors is given by:

$$k_{xs} = \frac{\omega}{c}\cos\theta_o\sin\phi_o, \quad (7)$$

$$k_{ys} = \frac{\omega}{c}\sin\theta_o\sin\phi_o, \quad (8)$$

$$k_{zs} = \frac{\omega}{c}\cos\phi_o. \quad (9)$$

When there is no array steering, $k_{xs}=k_{ys}=k_{zs}=0$.

A system user will define the geometry of the virtual array of sensors with the necessary values for each of the variables in equation (1) or modified versions of equation (1) as described below. The primary objective when defining the geometry of the model is to have the sensors properly oriented in the array. In the present system, the geometry of the model is defined using the coordinate systems of the sensor and the array. Both coordinate systems must be considered simultaneously to obtain proper alignment of the sensors within the array. The sensor and array coordinate systems are shown in FIG. 2. Lowercase labels and the subscript "e" are used to signify the sensor's coordinate system and its variables; uppercase labels and the subscript "a" signify the array's coordinate system and its variables.

Proper orientation of the sensors within the array depends on two conditions: the direction of the sensor's maximum response axis (MRA) within the sensor coordinate system and the alignment of the array's axis within the coordinate system. When modeling sensors with omni-directional point receivers, the MRA of the sensor must be directed along the $x_e$-axis of the sensor's coordinate system. For all other sensor types, including sensors with cosine function directivity, baffled rings, and circular plane pistons, the present invention automatically directs the sensor's MRA along the $x_e$-axis.

Figure 3A:
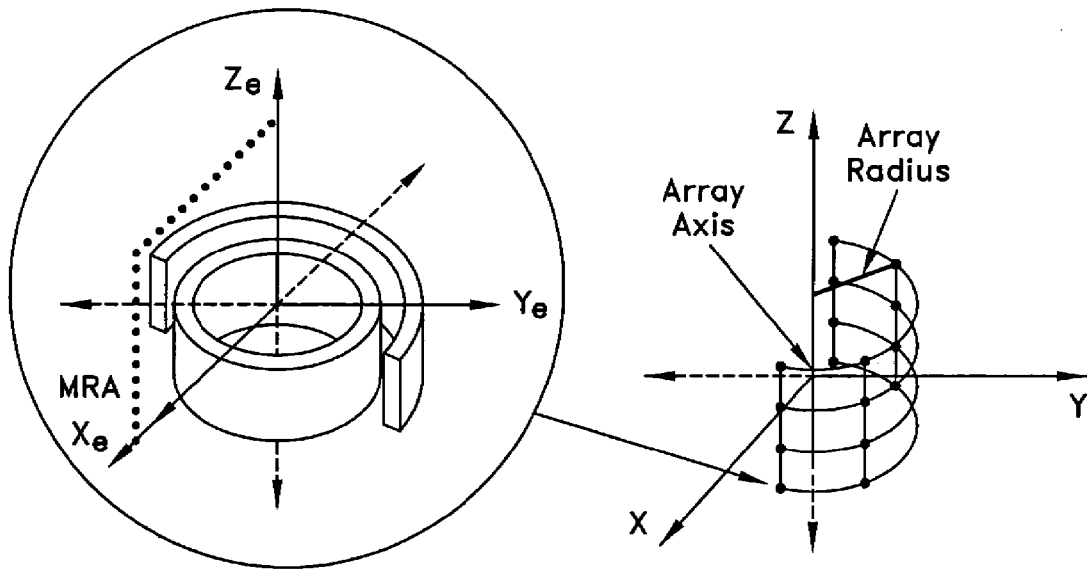
Figure 3B:
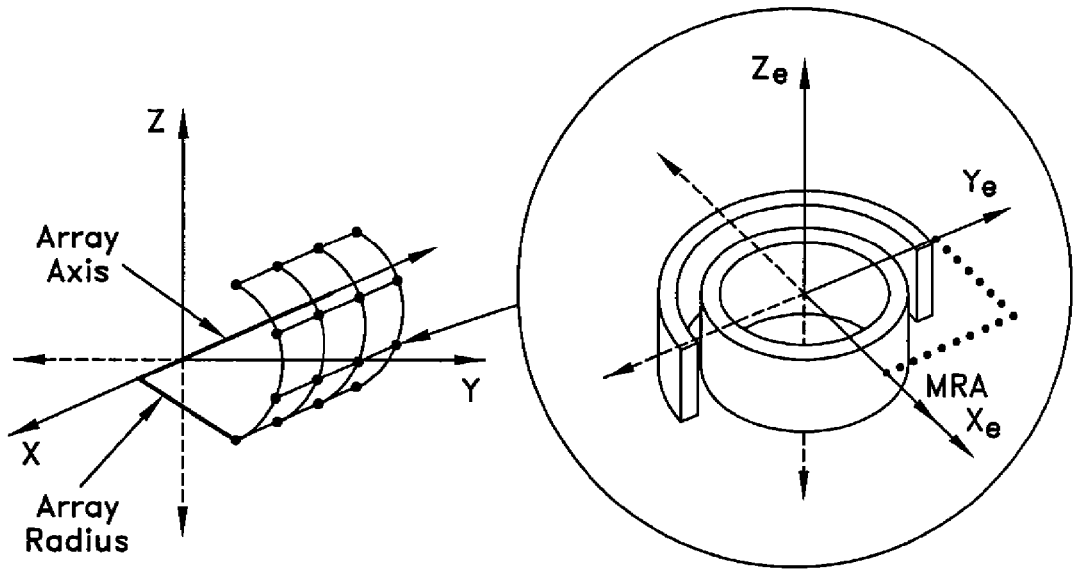

The alignment of the array's axis within the array's coordinate system depends on the orientation of the sensor. If the $x_e$-$z_e$ plane of the sensor is parallel to the axis of the array, the axis should be collinear with the Z-axis of the array's coordinate system. If the $x_e$-$y_e$ plane of the sensor is parallel to the axis of the array, the array's axis must be collinear with either the X or Y-axis of the array's coordinate system. Examples of a properly aligned array axis for two possible orthogonal orientations of a baffled ring within an array are shown in FIG. 3a and FIG. 3b. Note that the MRA of the baffled ring in each figure is directed along the $x_e$-axis.

The next step in the method to calculate the directivity index requires defining the coordinate system parameters. In a preferred embodiment, the user enters the sensor and array geometries into the virtual model using both a graphical user interface and external data files such as spreadsheet files. The graphical user interface is used to define the sensor's parameters, but only for sensors with cosine-function directivity, baffled rings, and circular plane pistons, not for sensors modeled with omni-directional point receivers. An external sensor data file is necessary when a sensor is modeled with omni-directional point receivers. The graphical user interface is also not used to define the array geometry. A required array data file is used to define the geometry of the array.

To model sensors with omni-directional point receivers, the sensor data file must contain the geometric spacing and shading values of each point receiver in a matrix or spreadsheet format with rows and columns. The program reads only the first four columns of the sensor data file. All other columns may be used for computational space. The first three columns list the $x_e$-, $y_e$-, and $z_e$-coordinates of all the point receivers; the fourth column contains the shading coefficient of each point receiver. When every sensor within the array is omni-directional, $H_e(\theta_{em}, \phi_{em})=1$ at all spatial angles for every sensor and equation (1) becomes the simplified case for an array of omni-directional point receivers.

The array data file is a required file that contains array parameters, such as the geometric spacing, normal vector angles, and shading coefficients for all sensors within the array. The array data is arranged in a matrix or spreadsheet format with rows and columns. The program reads only the first six columns of the array data file. The first three columns list the X-, Y-, and Z-coordinates of all the sensors. The fourth and fifth columns contain the azimuthal and polar angles, respectively, of the normal vector for each sensor. The sixth column contains the shading coefficient of each sensor.

Figure 4:
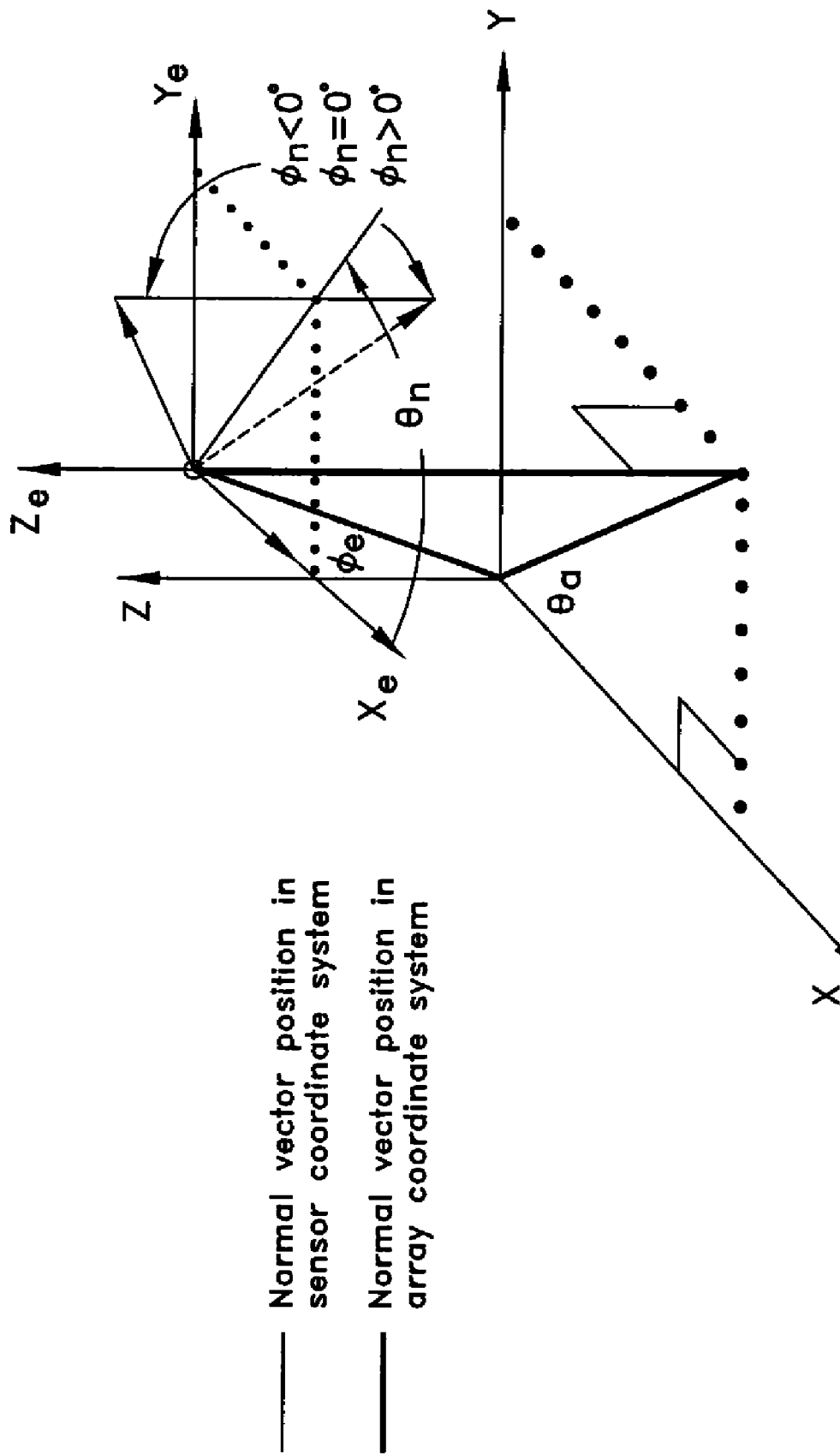
FIG. 4 is an illustration of the azimuthal and polar angles of the sensor's normal vector defined in the array's coordinate system.
Figure 6:
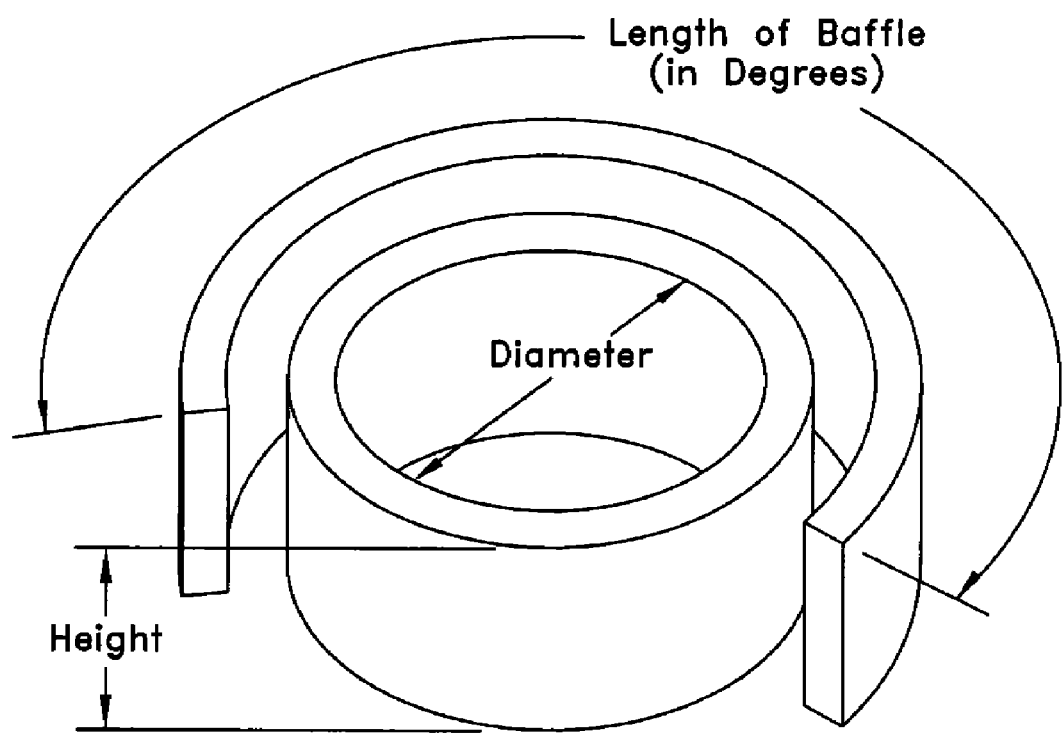
FIG. 6 illustrates the three required dimensions of the baffled rings.
Figure 9:
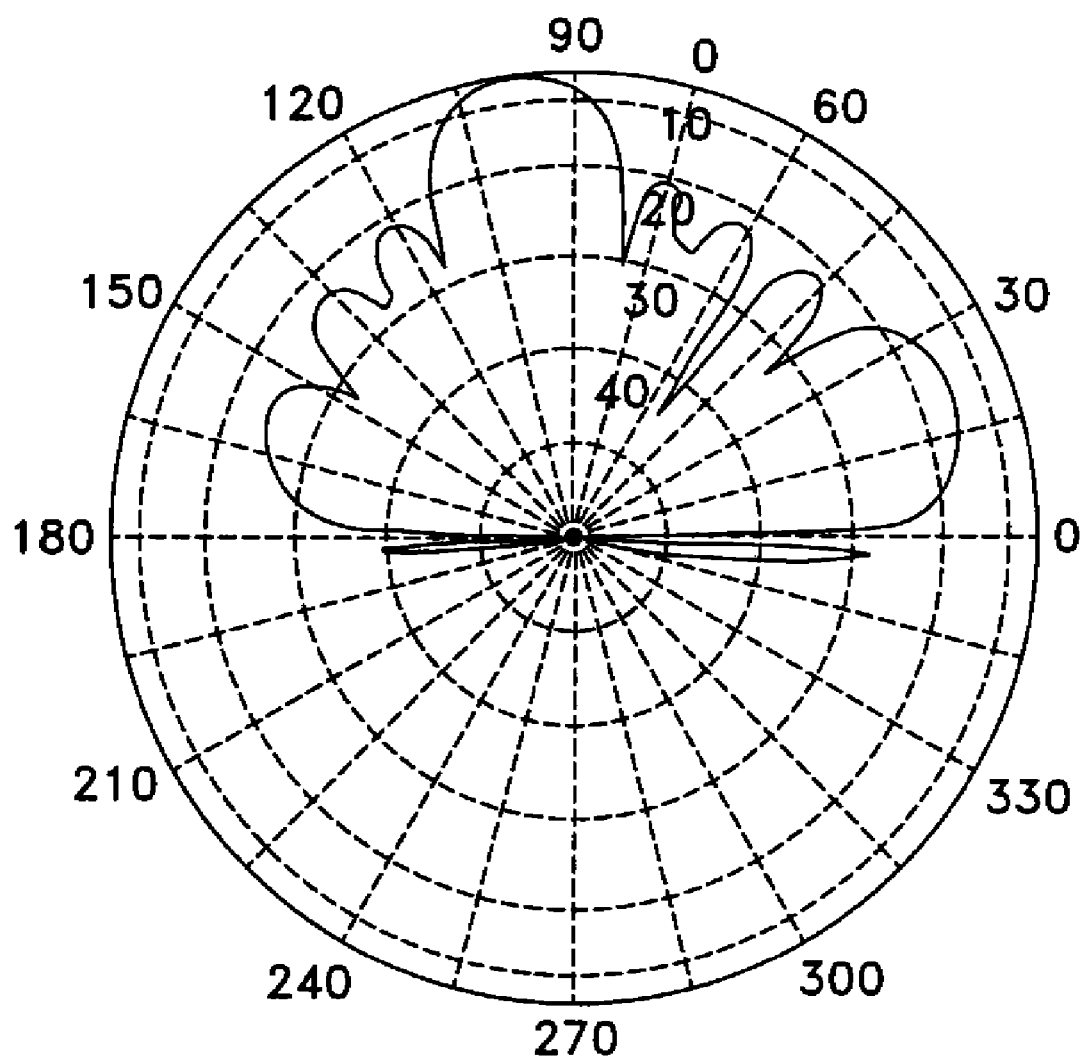
FIG. 9 is a beam pattern from the cosine array example.

The azimuthal and polar angles of a sensor's normal vector have defined ranges. These are defined using coordinate systems for both the sensor and the array. The angular position of the sensor's normal vector within the array's coordinate system is relative to its position within the sensor's coordinate system. The range of the normal vector azimuthal angle within the array's coordinate system is 0° to 180°. The range of the normal vector polar angle within the array's coordinate system is −90° to 90°. The azimuthal and polar angles of the sensor's normal vector position are shown in FIG. 4. The variable $\theta_n$ is the azimuthal angle of the sensor's normal vector, and $\phi_n$ is the polar angle of the sensor's normal vector.

After defining the array coordinate system parameters and the sensor coordinate system parameters for omni-directional point receiver sensors, the next steps involve defining sensor coordinate system parameters for sensors that are not omni-directional point receiver sensors. In a preferred embodiment of the invention, sensor coordinate system parameter data for sensors that are not omni-directional point receivers sensors are defined using a graphical user interface. A preferred embodiment of the graphical user interface for the present invention is illustrated in FIG. 5. The system user can enter the name of the input file containing the array data or use the Browse button at the top of the graphical user interface screen to select the file name. The user can then use the remaining graphical user interface options to define the type of sensor used in the array, the operational data of the array, the frequencies of interest, and the type of DI calculation The SENSOR DATA section of the graphical user interface is illustrated in FIG. 5. It contains the options for defining the directivity of the sensor used in the array. The sensor can either be baffled by the array structure or retain its free-field directivity response. If the sensor is baffled by the array structure, the user should select the Baffled by the array option on the user interface. If the behavior of the sensor within the array is the same as it is within the free field, the user should select the Not Baffled option.

There are four options for modeling sensor directivity: (1) as a single sensor modeled with omni-directional point receivers, (2) as a single sensor with cosine function directivity, (3) as a single baffled ring, or (4) as a single circular plane piston.

If the Sensor with Omni-Directional Point Receivers option is selected, no further user action is necessary. The actual data will be entered from the sensor data file as described above. To model a sensor with omni-directional point receivers, the system uses the following equation (a modified version of equation (1)) to calculate the pressure detected by an array of omni-directional point receivers $A_e$:

$$A_e(\theta_e, \phi_e) = \sum_{m=1}^{M} w_{em} e^{i[x_{em}(k_x - k_{xs}) + y_{em}(k_y - k_{ys}) + z_{em}(k_z - k_{zs})]}, \quad (10)$$

where subscript e denotes the acoustic array; $\theta_e$ and $\phi_e$ are the azimuthal and polar angles, respectively, relative to the sensor coordinate system as illustrated in FIG. 2; M is the total number of point receivers in the sensor; $w_{em}$ is the shading coefficient of the $m^{th}$ point receiver; $x_{em}$, $y_{em}$, and $z_{em}$ are the coordinates of the $m^{th}$ point receiver relative to the sensor coordinate system; $k_x$, $k_y$, and $k_z$ are the wave numbers as given in equations (4), (5), and (6); and $k_{xs}=k_{ys}=k_{zs}=0$ because the point receivers within the sensor are not steered. To yield the directivity function of the sensor at all spatial angles relative to the sensor coordinate system, the function $A_e$ is normalized relative to its maximum value; thus $$H_e(\theta_e, \phi_e) = \frac{|A_e(\theta_e, \phi_e)|}{|\max[A_e(\theta_e, \phi_e)]|}. \quad (11)$$

The values of the sensor directivity function $H_e$ are stored in a matrix and later used as additional "weighting" coefficients in equation (1) as the variable $H_e(\theta_{em}, \phi_{em})$. The sensor directivity matrix is two-dimensional, with the number of rows equivalent to the angular increments in the polar direction and the number of columns equal to the angular increments in the azimuthal direction. The azimuthal and polar angles of a particular sensor normal vector are used to "rotate" the matrix $H_e$ to account for the angular direction of each sensor within the array. The rotation of the matrix is mathematically performed using equations (2) and (3).

If the Sensor with Cosine Function Directivity option is selected, the system user needs to select the corresponding option. (for example from a drop-down list box) to define whether the directivity is being modeled with a cosine function or the square of cosine:

$$H_e(\theta_e, \phi_e) = \begin{cases} \cos(\theta_e)\sin(\phi_e) \\ \text{or} \\ \cos^2(\theta_e)\sin^2(\phi_e) \end{cases}.$$

If the user selects the Baffled Ring option, then the user needs to specify the values for four required parameters: Ring Diameter, Ring Height, Length of Baffle, and Mode of Vibration. The ring diameter (in meters) is referenced from the outside surface of the ring receiver. The height of the baffle is assumed to be the same as the height of the ring (in meters). The length of the baffle coverage can only be entered in integers from 0° to 360°. These three required dimensions of the baffled ring are specified as shown in FIG. 7. The fourth required parameter for baffled rings allows the user to operate the ring receiver in the 0, 1, or 2 mode of vibration.

The present invention uses the theory of a vibrating cylindrical element with infinite length to predict and support experimental observations of the effects caused by ring diameter, operation frequency, baffle coverage and mode of vibration on the horizontal directivity (plane perpendicular to the axis of the cylinder) of real baffled ring transducers. The equation for the radiation of sound by a vibrating section of cylinder from $-\alpha$ $\mathbf{a} < \mathbf{a}_0$ with radius r, infinite height, and operating in the free field, is $$P(r, \theta, \phi) = \frac{2\rho c U_0}{\pi^2} \sqrt{\frac{c}{fr}} e^{ik[ct-r]} \quad (12)$$

$$\sum_{m=0}^{\infty} \cos(m\theta) \left[ \frac{\sin(m-b)\alpha_0}{m-b} - \frac{\sin(m+b)\alpha_0}{m+b} \right] \frac{e^{i[\gamma_m + \frac{\pi}{4}(2m+1)]}}{C_m}$$

Where the variable $\rho$ is density, c is the speed of sound $U_0$ is the reference velocity on the surface of the vibrating element, f is frequency, i is the square root of −1, k is the wavenumber, and b is the mode of vibration of the cylindrical element (b=0=zero mode, b=1=one mode, etc.).

The coefficients $\gamma_m$ and $C_m$ are defined by the following equations:

$$\gamma_m = \tan^{-1}\left[\frac{J_{m+1}(x) - J_{m-1}(x)}{Y_{m-1}(x) - Y_{m+1}(x)}\right]; C_m = \frac{J_{m+1}(x) - J_{m-1}(x)}{2\sin(\gamma_m)}(m > 0), \quad (13)$$

where J and Y are Bessel functions of the first and second kind, respectively, and the argument x=kr. For the case when m=0, the coeffeicients $C_0$ and $\gamma_0$ are defined by $$\gamma_0 = \tan^{-1}\left[\frac{-J_1(x)}{Y_1(x)}\right]; C_0 = \frac{2J_1(x)}{\sin(\gamma_0)}. \quad (14)$$

when the argument (m±b)=0, then $$\frac{\sin(m \pm b)\alpha_0}{m \pm b} = \alpha_0. \quad (15)$$

The theoretical directivity of a baffled ring transducer operating in the free field at all spatial angles is calculated by multiplying the directivity of a vibrating section of a cylinder with infinitesimal length by the directivity of a continuous line array with a length equivalent to the height of the baffled ring transducer.

The pressure generated by a vibrating section of a cylinder from $-\alpha_0 < \alpha < \alpha_0$ with infinitesimal length is $$P_{tr}(r, \theta, \phi) = \frac{2pcU_0}{\pi^2}\sqrt{\frac{c}{fr}}\, e^{ik[ct-r]}\frac{1}{\sin(\phi)} \quad (16)$$

$$\sum_{m=0}^{\infty}\cos(m\theta)\left[\frac{\sin(m-b)\alpha_0}{m-b} - \frac{\sin(m+b)\alpha_0}{m+b}\right]\frac{e^{i[\gamma_m + \frac{\pi}{4}(2m+1)]}}{C_m} \quad (17)$$

Where the subscript tr represents thin ring. The coefficients C0, $C_m$, $\gamma_m$ and $\gamma_m$ are the same as in equations 15 and 14 except the argument x=kr sin $\phi$. When $\phi$=0 and $\pi$.

$$C_0 = \frac{4}{\pi x}, \gamma_0 = \pi\left(\frac{x}{2}\right)^2, \text{ and} \quad (18)$$

$$C_m = \frac{m!}{2\pi}\left(\frac{2}{x}\right)^{m+1}, \gamma_m = \frac{-\pi m}{(m!)^2}\left(\frac{x}{2}\right)^{2m} \quad (19)$$

It should be noted that equation 17 is equivalent to equation 12 when $\phi=\pi/2$.

To yield the directivity of a baffled ring receiver of height h at all spatial angles, equation 17 is multiplied by the directivity of a continuous line source of length h and the resulting equation is normalized by its maximum value. Therefore $$H_e(\theta_e, \phi_e) = \left|\frac{P_{tr}(\theta_e, \phi_e)H_h(\phi_e)}{\max[P_{tr}(\theta_e, \phi_e)H_h(\varphi_e)]}\right|, \quad (20)$$

where the subscript e denotes the sensor; $H_e$ is the directivity of the sensor; $\theta_e$ and $\phi_e$ are the azimuthal and polar angles, respectively, relative to the sensor coordinate system; and $H_h$ is the directivity of a continuous line receiver of height h.

If the Circular Plane Piston option is selected for modeling sensor directivity, the user only needs to specify the Piston Diameter (in meters).

The OPERATIONAL DATA section of the graphical user interface is illustrated in FIG. 5. It contains settings for sound speed, angular integration increment, and steering. The default sound speed value in sea water used is 1500 m/sec. The user can change the sound speed (in m/sec) to match a specific operating environment.

A value known as the Angular Integration Increment is used to determine how finely the DI needs to be calculated. This user selectable option impacts some options for steering and beam pattern plotting. The default increment is 5°, but the user can select other values in the drop-down list box for the purpose of a convergence test. If a convergence test is needed, it should be performed at the highest operating frequency of the array, and the angular integration increment should be reduced by at least one-half of the previous value until the DI calculation converges to an answer that is within a reasonable amount of error.

The virtual array of sensors can be modeled with azimuthal steering, polar steering, or no steering. If the Array Steering option is selected, then the user needs to enter the azimuthal and polar angles for the MRA of the array. The azimuthal and polar steer directions are defined by the array's coordinate system as illustrated in FIG. 2. Only steer angles that are multiples of the angular integration increment are allowed. If the No Array Steering option is selected, then the out-of-phase responses of all sensors to an incident wave are used to compute the DI and the resulting beam patterns.

In the FREQUENCY DATA section of the graphical user interface FIG. 5, the user can define what frequencies are to be modeled. The array can be modeled either with a range of operational frequencies or at a single frequency.

If the user wishes to calculate the DI at multiple frequencies, then the user has to select the List of Frequencies option. In order to make use of this option the user must specify the name of a frequency data file that contains frequency data arranged in a matrix or spreadsheet format with rows and columns. The frequencies (in Hertz) are read from the first column of the first spreadsheet in the frequency data file. The number of frequencies listed is directly related to the execution time of the program.

The Single Frequency with Beampattern option is selected when the DI is desired at a single frequency. This option will also provide the user with a plot of the beam pattern of the array at the requested frequency. The user is required to enter the frequency (in Hertz), direction (azimuthal or polar), and angle (0° to 180°) of the plane that contains the desired beam pattern. Only plane angles that are multiples of the angular integration increment are allowed. The plot of the beam pattern is represented in decibel scale.

The REPLOT button is used to re-plot the beam pattern of a single frequency after the DI calculation is made.

The DI calculation executes when the user selects the CALCULATE DI option from the graphical user interface. The output value of the DI (in decibels) is displayed on the graphical user interface in the text box to the right of the CALCULATE DI button and the button is then disabled. If a range of frequencies was run, the user is directed to a directivity index output file that contains the DI (in decibels) for each frequency that was run.

The directivity index DI is calculated using the following equation:

$$DI = 10 \log_{10} DF, \quad (21)$$

where the directivity factor DF is given by $$DF = \frac{4\pi}{\int_0^{2\pi} \int_0^{\pi} \left[ \frac{|A_a(\theta_a - \theta_s, \varphi_a - \varphi_s)|}{\max[|A_a(\theta_a - \theta_s, \varphi_a - \varphi_s)|]} \right]^2 \sin\phi \, d\phi \, d\theta}. \quad (22)$$

The REPLOT button in the FREQUENCY DATA section of the graphical user interface allows the user to view a beam pattern in another plane after the DI calculation has been made. This option is available only for an array modeled at a single frequency. For an array modeled with multiple frequencies, the REPLOT button stays disabled.

An example for the setup and execution of the system and method to obtain the directivity index (DI) for a linear array of baffled rings is provided below. In this example, there are 17 baffled rings in the array, equally spaced 0.3 m along the Z-axis. The array is centered at the origin of the array's coordinate system. The maximum response axis (MRA) of each sensor is directed along the Y-axis. The baffled ring diameter is 0.220 m, the height is 0.110 m, and the length of the baffle is 180°. The mode of vibration of the rings can be set to zero (0 mode). The maximum operating frequency of the array is 4000 Hz, and the array has uniform shading.

In operation the system may be used according to the following example for the setup and execution to obtain the directivity index (DI) for a linear array of baffled rings. In. this example, there are 17 baffled rings in the array, equally spaced 0.3 m along the Z-axis. The array is centered at the origin of the array's coordinate system. The maximum response axis (MRA) of each sensor is directed along the Y-axis. The baffled ring diameter is 0.220 m, the height is 0.110 m, and the length of the baffle is 180°. The mode of vibration of the rings can be set to zero (0 mode). The maximum operating frequency of the array is 4000 Hz, and the array has uniform shading.

The first objective is to configure the array. A data file is created that will contain the array parameters in a matrix or spreadsheet format. The new array parameters for each sensor (X-, Y-, and Z-coordinates; azimuthal angle; polar angle; shading coefficient), are arranged one sensor per row, as shown in FIG. 10.

The next objective is to delineate the frequencies of interest. The directivity index for the array is calculated for each frequency of interest. A data file is created that will contain the frequency values in a matrix or spreadsheet format. The frequencies (in Hertz) are arranged in the first column of a spreadsheet, as shown in FIG. 11. The DI will be calculated for each frequency entered into this file.

The next objective is to select the appropriate array data file. Using the Browse button on the GUI, find and select the new array data file and then select Open.

The next objective is to choose the sensor data parameters. In this example, each sensor is baffled by the array structure. The user would therefore select the Baffled by the array option. In this example the user also selects the Baffled Ring option, and then, enters 0.220 for the Ring Diameter, 0.110 for the Ring Height field, and 180 for the Length of Baffle. Finally, the user selects 0 for the Mode of Vibration.

The next objective is to choose the operational data parameters. The user selects and enters the following: Sound Speed: Enter 1500; Angular Integration Increment: Select the largest value (5) from the list box (This will allow a quick calculation to determine a "ballpark" DI value. The user can experiment with smaller values later to maximize accuracy and minimize computation time); Steering: Select Array Steering and then enter 90 for the Azimuthal Steer Angle and 90 for the Polar Steer Angle.

The next objective is to choose the frequency data parameters. The user selects the Single Frequency with Beampattern option. (Note that the array in this example uses more than one frequency; but, in the spirit of quick calculation, use one frequency to speed up the experiments involving different integration increments.) The user enters 4000 for the Single Frequency. The user selects Azimuthal from the list box for the Beampattern Plane and enters 90 for the Beampattern Plane Angle.

With the above entered data, the program is ready to calculate a directivity index. The user selects CALCULATE DI. The output in this example is 18.518. Since a large Angular Integration Increment (5°) was used in order to minimize the computation time, this is just a rough estimate of the DI for this array. The user may choose to re-examine the Angular Integration Increment, and try a smaller integration increment. The user may select 2 from the Angular Integration Increment list box, and then chose the CALCULATE DI option. The output in this example is 19.7345. This is equal to a 6.6% error from the first value. The user may then choose a smaller integration increment. The user selects 1 from the Angular Integration Increment list box and then selects the CALCULATE DI option. The output is 19.7416. This is less than a 1% error from the second value. Thus, using an Angular Integration Increment of 2° should provide the best accuracy for the minimum computation time.

The user has the option of entering optimal calculation parameters and then re-calculating a final DI value. The user can refer to the OPERATIONAL DATA section of the GUI and select 2 from the Angular Integration Increment list box. The user can then refer to the FREQUENCY DATA section of the GUI and select the List of Frequencies option. The user can use the Browse button to find the correct frequency file and then select the CALCULATE DI option. The calculation is complete when the output refers the user to an output file containing directivity index values for the corresponding frequency values in the frequency file.

In operation the system may be used according to the following example for the setup and execution to obtain the directivity index (DI) for a planar array of sensors with cosine function directivity. In this example, the planar array consists of five rows of sensors in the X-direction and five columns of sensors in the Z-direction. The array is centered at the origin of the array coordinate system, and the MRA of each sensor points in the Y-direction. Hanning-function shading is applied in the Z-direction. The maximum operating frequency of the array is 2500 Hz The first objective is to configure the array. A data file is created that will contain the array parameters in a matrix or spreadsheet format. The new array parameters for each sensor (X-, Y-, and Z-coordinates; azimuthal angle; polar angle; shading coefficient), are arranged one sensor per row, as shown in FIG. 10.

The next objective is to select the appropriate array data file. Using the Browse button on the GUI, find and select the array data file and then select Open.

The next objective is to choose the sensor data parameters. In this example, each sensor is baffled by the array structure. The user would therefore select the Baffled by the array option. In this example the user also selects the Sensor with Cosine Function Directivity option.

The next objective is to choose the operational data parameters. The user selects and enters the following: Sound Speed: Enter 1500; Angular Integration Increment: Select the largest value (5) from the list box (This will allow a quick calculation to determine a "ballpark" DI value. The user can experiment with smaller values later to maximize accuracy and minimize computation time); Steering: Select Array Steering and then enter 90 for the Azimuthal Steer Angle and 90 for the Polar Steer Angle.

The next objective is to choose the frequency data parameters. The user selects the Single Frequency with Beampattern option. The user enters 2500 for the Single Frequency. The user selects Azimuthal from the list box for the Beampattern Plane and enters 90 for the Beampattern Plane Angle.

With the above entered data, the program is ready to calculate a directivity index. The user selects CALCULATE DI. The output in this example is 22.8887. Since a large Angular Integration Increment (5°) was used in order to minimize the computation time, this is just a rough estimate of the DI for this array. The user may choose to re-examine the Angular Integration Increment, and try a smaller integration increment. The user may select 2.5 from the Angular Integration Increment list box, and then chose the CALCULATE DI option. The output in this example is 22.8892. This is less than a 1.0% error from the first value. Therefore, using an increment of 5° should provide the best accuracy for the minimum computation time. However, the angular integration increment will remain 2.5° in order to have well-defined beam patterns.

The user has the option of entering optimal calculation parameters and then re-calculating a final DI value. The user can refer to the OPERATIONAL DATA section of the GUI and select 2.5 from the Angular Integration Increment list box. In the same section of the GUI the user can then change the Polar Steer Angle to 97. The program should change the input to 97.5, which is a multiple of the Angular Integration Increment. The user can then select the CALCULATE DI option. The output is 22.6131 and the resulting beam pattern is illustrated in FIG. 12.

The primary advantage of this invention is that the directivity of each sensor within the array is now dependent on the shape and operating frequency of the sensor. The directivity of the sensor is no longer restricted to a frequency independent response that is either omni-directional or a cosine function. The sensors used in the array can be modeled using four different methods: (1) as a single sensor modeled with omni-directional point receivers, (2) as a single sensor with cosine function directivity, (3) as a single baffled ring, or (4) as a single circular plane piston. If each sensor is modeled with omni-directional point receivers, the sensor itself can be in the form of one single point receiver, a line of point receivers, a plane of point receivers, or a volume of point receivers. If each sensor is modeled with a cosine function, the directivity of the sensor can either be cosine or the square of cosine. If each sensor is modeled as a baffled ring, the ring height, diameter, mode of vibration, and length of baffle coverage can be modified.

While it is apparent that the illustrative embodiments of the invention disclosed herein fulfill the objectives of the present invention, it is appreciated that numerous modifications and other embodiments may be devised by those skilled in the art. Additionally, feature(s) and/or element(s) from any embodiment may be used singly or in combination with other embodiment(s). Therefore, it will be understood that the appended claims are intended to cover all such modifications and embodiments, which would come within the spirit and scope of the present invention.

What is claimed is:

1. A method of determining the directivity index for an array of passive acoustic sensors comprising:
    creating a virtual array of sensors wherein said virtual array of sensors models an array of passive acoustic directional sensors in an isotropic noise field with a perfectly correlated signal relative to an omni-directional receiver;
    defining an array coordinate system for the virtual array of sensors;
    defining a sensor coordinate system for the virtual array of sensors;
    defining at least one sensor attribute for the virtual array of sensors;
    defining operational data for the virtual array of sensors;
    defining frequency data for the virtual array of sensors;
    calculating directivity index of said virtual array of sensors based upon the array coordinate system, sensor coordinate system, at least one sensor attribute, operation data and frequency data for the virtual array of sensors; and
    displaying the directivity index of the virtual array of sensors as a numerical value.

2. The method of claim 1 wherein the step of creating a virtual array of sensors comprises using the following equation for the pressure detected by an array of directional sensors $$A_a(\theta_a - \theta_s, \phi_a - \phi_s) = \sum_{m=1}^{M} H_e(\theta_{em}, \phi_{em}) w_m e^{i[X_m(k_x - k_{xs}) + Y_m(k_y - k_{ys}) + Z_m(k_z - k_{zs})]}.$$

3. The method of claim 1 wherein the step of defining an array coordinate system comprises:
    providing an X, Y, and Z coordinate of all the sensors;
    providing an azimuthal angle of the normal vector for each sensor;
    providing a polar angle of the normal vector for each sensor; and
    providing a shading coefficient of each sensor.

4. The method of claim 1 wherein the step of defining a sensor coordinate system comprises:
    providing the x, y, and z coordinates of each sensor; and
    providing the shading coefficient of each sensor.

5. The method of claim 1 wherein the operational data being defined comprises sound speed, angular integration increment, and steering.

6. The method of claim 1 wherein the at least one sensor attribute defines the type of sensor used in the virtual array of sensors as baffled.

7. The method of claim 1 wherein the at least one sensor attribute defines the type of sensor used in the virtual array of sensors as not baffled.

8. The method of claim 1 wherein the at least one sensor attribute defines the type of sensor used in the virtual array of sensors as an omni-directional point receiver.

9. The method of claim 1 wherein the at least one sensor attribute defines the type of sensor used in the virtual array of sensors as a single sensor with a cosine function directivity.

10. The method of claim 1 wherein the at least one sensor attribute defines the type of sensor used in the virtual array of sensors as a single baffled ring sensor.

11. The method of claim 1 wherein the at least one sensor attribute defines the type of sensor used in the virtual array of sensors as a single circular plane piston sensor.

12. The method of claim 1 wherein calculating the directivity index comprises solving for the following equation:

$$DI = 10 \log_{10} DF,$$

where the directivity factor DF is given by $$DF = \frac{4\pi}{\int_0^{2\pi}\int_0^{\pi}\left[\frac{|A_a(\theta_a-\theta_s,\varphi_a-\varphi_s)|}{\max[|A_a(\theta_a-\theta_s,\varphi_a-\varphi_s)|]}\right]^2 \sin\phi\, d\phi\, d\theta}.$$

13. The method of claim 1 further comprising the steps of plotting a beam pattern based on the calculated directivity index of the virtual array of sensors.

14. The method of claim 1 wherein the step of displaying the directivity index is accomplished through a monitor attached to a digital computer that calculates the directivity index of the virtual array of sensors.

15. The method of claim 2 wherein the virtual array of sensors is modeled on a digital computer.

16. The method of claim 3 where in providing an X, Y, and Z coordinate of all the sensors, providing an azimuthal angle of the normal vector for each sensor, providing a polar angle of the normal vector for each sensor and providing a shading coefficient of each sensor is accomplished by a system user inputting the appropriate values through a graphical user interface of a digital computer.

17. The method of claim 5 wherein operational data being defined is defined by a system user inputting the appropriate values of sound speed, angular integration increment, and steering through a graphical user interface of a digital computer.

* * * * *